United States Patent
Kempe

(10) Patent No.: US 8,850,886 B2
(45) Date of Patent: Oct. 7, 2014

(54) ELECTROMECHANIC MICROSENSOR

(75) Inventor: Volker Kempe, Lieboch (AT)

(73) Assignee: Maxim Integrated Products, Inc., San Jose, CA (US)

( * ) Notice: Subject to any disclaimer, the term of this patent is extended or adjusted under 35 U.S.C. 154(b) by 226 days.

(21) Appl. No.: 13/203,550

(22) PCT Filed: Feb. 3, 2010

(86) PCT No.: PCT/EP2010/051300
§ 371 (c)(1),
(2), (4) Date: Aug. 26, 2011

(87) PCT Pub. No.: WO2010/097275
PCT Pub. Date: Sep. 2, 2010

(65) Prior Publication Data
US 2011/0308314 A1    Dec. 22, 2011

(30) Foreign Application Priority Data
Feb. 27, 2009 (DE) .......................... 10 2009 001 247

(51) Int. Cl.
*G01C 19/56* (2012.01)
*G01C 19/574* (2012.01)
(52) U.S. Cl.
CPC .................................. *G01C 19/574* (2013.01)
USPC ......................... 73/504.04; 73/504.12; 73/510
(58) Field of Classification Search
USPC ............... 73/504.12, 504.14, 504.16, 504.04, 73/514.32, 510, 511
See application file for complete search history.

(56) References Cited

U.S. PATENT DOCUMENTS

| | | | |
|---|---|---|---|
| 5,239,868 A | 8/1993 | Takenaka | |
| 5,349,855 A | 9/1994 | Bernstein | |
| 5,869,760 A * | 2/1999 | Geen .......................... | 73/504.12 |
| 6,257,057 B1 | 7/2001 | Hulsing, II | |
| 7,284,429 B2 * | 10/2007 | Chaumet et al. ........... | 73/504.12 |
| 7,461,552 B2 * | 12/2008 | Acar ........................... | 73/504.04 |
| 7,617,728 B2 * | 11/2009 | Cardarelli .................. | 73/504.16 |
| 8,256,290 B2 * | 9/2012 | Mao ........................... | 73/504.12 |

(Continued)

FOREIGN PATENT DOCUMENTS

| | | |
|---|---|---|
| CN | 1530632 A | 9/2004 |
| CN | 1826532 A | 8/2006 |

(Continued)

OTHER PUBLICATIONS

International Search Report for Co-Pending PCT Application No. PCT/EP2010/051300, May 3, 2010.

(Continued)

*Primary Examiner* — Helen Kwok
(74) *Attorney, Agent, or Firm* — North Weber & Baugh LLP

(57) ABSTRACT

The invention relates to an electromechanic microsensor (MEMS) comprising drive elements which are moved linearly in an x-y plane and disposed on a substrate to determine at least two, preferably three, components of the yaw rate vector of a substrate, wherein two groups of drive elements are driven in directions running essentially at right angles to each other. The MEMS according to the invention is characterized in that the drive elements, which are moved at right angles to each other, are connected to one another to synchronize the movements via a coupling device that is rotatably mounted on the substrate.

17 Claims, 2 Drawing Sheets

(56) References Cited

U.S. PATENT DOCUMENTS

Figure 1:
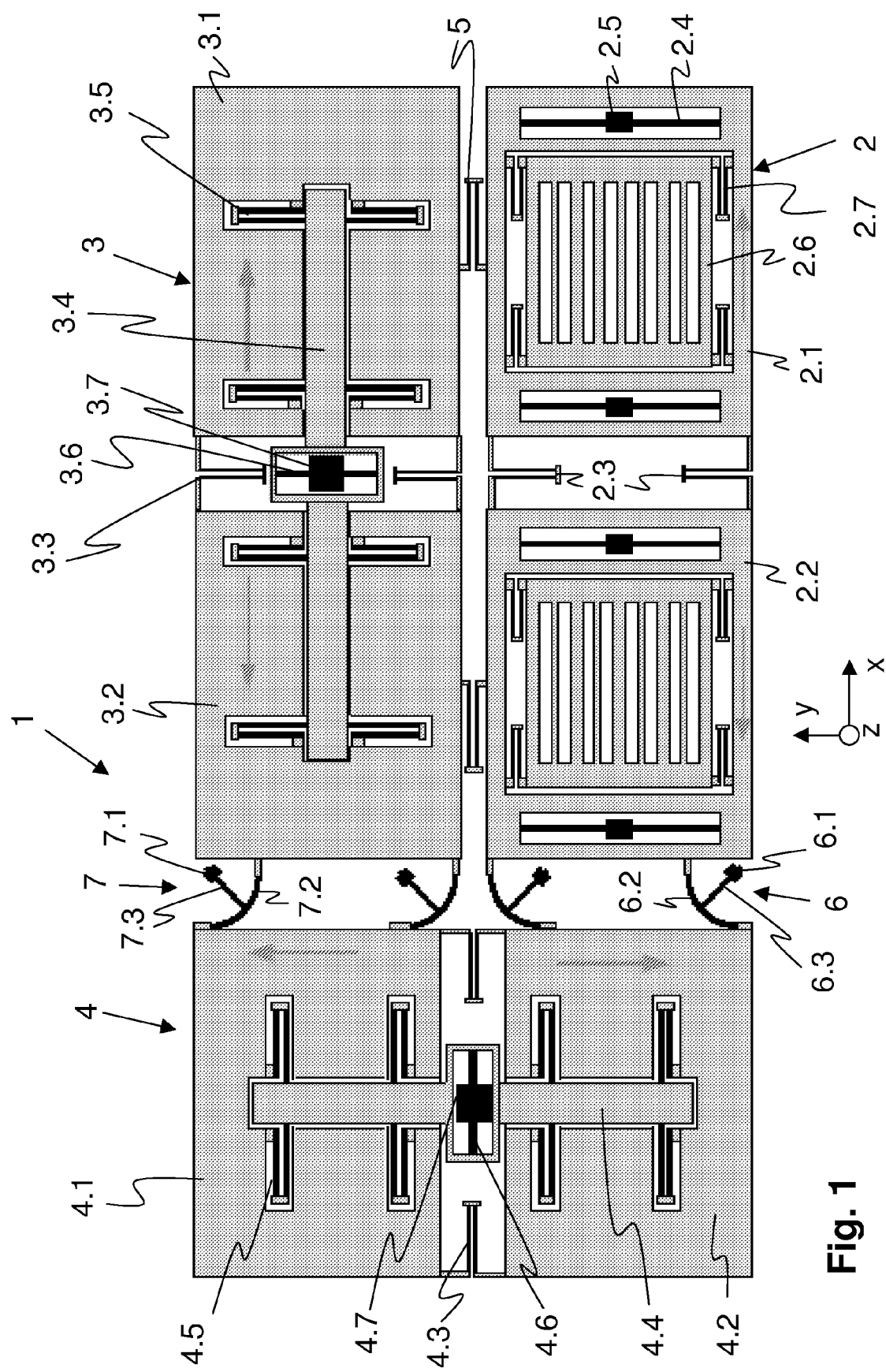

| | | | |
|---|---|---|---|
| 8,443,668 B2 * | 5/2013 | Ohms et al. | 73/504.12 |
| 8,459,110 B2 * | 6/2013 | Cazzaniga et al. | 73/504.12 |
| 8,479,575 B2 * | 7/2013 | Kempe | 73/504.12 |
| 2004/0169244 A1 | 9/2004 | MacGugan | |
| 2006/0042382 A1 | 3/2006 | DCamp | |
| 2007/0266785 A1 | 11/2007 | Cadarelli | |
| 2013/0031977 A1 * | 2/2013 | Kempe | 73/504.04 |

FOREIGN PATENT DOCUMENTS

| | | |
|---|---|---|
| CN | 1841020 A | 10/2006 |
| CN | 101135563 A | 3/2008 |
| CN | 101839718 A | 9/2010 |
| DE | 19610554 A1 | 10/1996 |
| DE | 10134620 A1 | 2/2003 |
| JP | 7218268 | 8/1995 |
| JP | 2007155489 | 6/2007 |
| JP | 2007322295 | 12/2007 |

OTHER PUBLICATIONS

Office Action dated Jul. 11, 2013, in corresponding Chinese Patent Application No. 201080009206.0.

Office Action dated Oct. 8, 2013, in corresponding Japanese Patent Application No. 2011-551455.

* cited by examiner

ELECTROMECHANIC MICROSENSOR

This invention refers to an micro-electro-mechanical sensor (MEMS) with drive elements that move linearly along an x-y plane, arranged on a substrate for determining at least two, preferably three, components of the substrate's yaw rate vector, wherein two groups of drive elements exist that are essentially driven in directions perpendicular to each other.

MEMS sensors or to be precise MEMS gyroscopes are known in which oscillatorily driven elements are mounted on a substrate. These drive elements are generally arranged on the substrate with elastic springs that can change their shape, which makes the oscillating movement possible. Furthermore, the entire drive element or at least a part thereof is arranged in such a way that if the substrate is rotated around a predetermined axis owing to the Coriolis forces (which act on the drive element moved) and is oscillatorily deflected in a predetermined direction. As a rule, springs are provided for this as well to allow this deflection.

When designing the drive elements, the aim is always making the springs elastic in only predetermined directions to rule out overlaid spring movements to a large extent. So the turning of the substrate around several axes can be determined (i.e. for determining the several components of the substrate's yaw rate vector), it is known that several such sensors—which are capable of determining a component of the yaw rate vector—can be combined with one another, Thus, for example, similar elements are arranged on a substrate or several sensors in such a way with regard to one another that the yaw rate vector components to be determined by deflecting the drive elements as a result of the occurring Coriolis forces can be determined. The individual sensors or parts thereof are therefore arranged in such a way to each other that the individual components of the yaw rate vector can be determined. The disadvantage of this is that every sensor needs an individual drive control. In addition, owing to the manufacturing tolerances, for example, differences in the movement frequencies of the drive elements cannot be ruled out. Because of this, different Coriolis forces occur, which in turn lead to an unequal deflection of the drive elements. The resulting correction effort leads to considerable extra expenses in control electronics.

Also known are micro-electro-mechanical gyroscopes that have numerous drive elements moving jointly for determining several components of the yaw rate vector. With regard to their size, such sensors do not utilize optimally the rectangular floor space available in MEMS technologies and therefore lead to an extra expense.

The task of this invention is to create a simple and economical MEMS gyroscope that is easily manufactured but will nonetheless offer accurate measurement.

A micro-electro-mechanical sensor according to the invention, also named MEMS gyroscope, has linear drive elements that move along an x-y plane. The drive elements are arranged on a substrate and serve for determining at least two, preferably three, components of the substrate's yaw rate vector. Two drive element groups are provided, largely driven in directions running perpendicularly to each other. According to the invention, the drive elements that move perpendicularly to one another are connected to each another with a coupling device rotatably arranged on the substrate for synchronizing the movements. If there are two drive elements that move perpendicularly to one another, then two components of the yaw rate vector can be determined with them. However, at least in one of both groups of drive elements, two drive elements running in parallel are planned which—owing to a different deflectability that results from the occurring Coriolis forces—can already themselves determine two components of the yaw rate vector. Preferably, both of these equal drive elements moving parallel to one another are connected for this purpose to the perpendicularly-driven drive element of the second group by means of a coupling device according to the invention for synchronizing the movements. As a result of this, three components of the yaw rate vector can be determined. This means that a turn of the sensor or substrate around the x axis, the y axis, and the z axis can be determined.

The coupling device synchronizes the movements of both groups of drive elements that run perpendicularly to each other. This means that a synchronic swinging of the drive elements is supported. The movement direction of one group of drive elements is diverted to the movement direction of the other group of drive elements by the coupling device. In doing so, they are so stiff that they prevent the uneven oscillation of the drive elements. The coupling device is then displaced into an oscillatory turning movement by the two drive elements linked by it. The linking of both drive elements by the coupling device ensures that the oscillating linear movement of the two will run synchronously to the drive elements that the coupling device has linked. Thus, the coupling device according to the invention allows the moving drive elements of an MEMS gyroscope (which are made up of individual sensor devices responsible for the respective component of the yaw rate vector) to oscillate together uniformly. As a result of this, the reaction to the occurring Coriolis forces is similar and therefore a high measurement accuracy of the micro-electro-mechanical sensors is obtained.

In an advantageous execution of the invention, the drive elements of a group can be moved parallel to one another and at least two of the drive elements that move parallel to each other are also connected to one another with coupling devices, which are rigid in driving direction and thereby synchronize the drive movement of two drive elements at any one time. This arrangement ensures that not only the drive elements that move perpendicularly to one another will oscillate synchronously to each other but also the drive elements that move parallel to one another. Overall, a system is thereby obtained that records all three components of the yaw rate vector equally and, owing to synchronously oscillating drive elements of comparable turns of the sensor, also generates comparable Coriolis forces and therefore deflections. As a result of this, it is possible to determine the corresponding turn with high accuracy. In addition, a 3-D gyroscope is created that boasts a very simple structure that optimally utilizes the available rectangular floor space and has high measurement accuracy with moderate electronic control effort.

In an advantageous execution of the invention, the several coupling devices used for synchronizing the parallel movements of the drive elements are equally executed to ensure that the transfer of the movement directions will run synchronously even when the drive elements oscillating in opposite directions of a sensor's partial section are provided for determining a component of the yaw rate vector. In doing so, the parts of the drive elements that oscillate in opposite directions are in fact similar to such structural parts that oscillate in opposite direction of another drive element moved parallel to it. The synchronization of the parts of the drive elements that run parallel and are driven in opposite directions therefore takes place similarly and synchronously too.

Another advantageous execution of the invention is also that the several synchronizing coupling devices of the movements taking place perpendicularly to one another are equal. This also ensures that even if the movements inside a drive element occur in opposite directions, the synchronization with drive elements running perpendicularly to this will take place equally, whereby similar movements should also be expected.

In an especially advantageous execution of the invention, the coupling device for synchronizing the movement occurring perpendicularly to one another is a strut that rotates around an anchor. The strut is preferably executed to resist pressure and pulling so that the movement of a drive element can exert a pressure or a pull on the drive element to be moved perpendicularly. This ensures that the coupling device will not be elastically deformed and because of this, the synchronization of both movement directions of the drive elements would no longer be guaranteed. The stiffness of the strut, which can be rotated around an anchor attached to the substrate, exerts a pressure or pull on the slower drive element so that the oscillating movement eventually runs equally.

The arched shape has proven to be an especially advantageous execution of the strut because as a result of this, the force deflection is optimally initiated from one movement direction to the other one that runs perpendicularly to it.

Preferably, the strut should be connected to the drive element driven in x direction in its first end section and in y direction in its second end section. As a result of this, a small moving mass of the strut is achieved since the strut merely creates the link from one drive element to another drive element.

To create a particularly stable strut, it is advantageous for the strut to be circular. This shape already makes it a stable structural part capable of withstanding almost all pressure or pulling loads. As a result of this, the synchronization of both drive elements is very accurate because strut deformations can be largely ruled out and therefore both drive elements no longer differ in velocity.

If a spring device is advantageously placed between the strut and the drive element, warping that could be caused by the movement directions offset perpendicularly to each other can be effectively prevented. The drive energy for operating the movements of the drive elements can thus be reduced and they can therefore oscillate more easily.

It is advantageous for the spring device to be executed rigidly in driving direction and non-rigidly when perpendicular to the driving direction. Each spring device is assigned to a movement direction and arranged on the strut and the drive element so a thrust or pulling power in driving direction can be initiated in the strut. The positional changes of the connecting joints caused by the rotation of the struts can be compensated by the spring device executed non-rigidly in this direction so no stresses could occur.

To achieve a uniform initiation and synchronization of the oscillatory movement, it is especially advantageous for the drive elements to be executed in pairs for every driving direction. As a result of this, the introduction of force is particularly uniform and stress-free.

Preferably, one of the drive elements is driven in x direction and arranged in such a way with an anchor on the substrate that it can be fully or partially deflected in y direction. This allows one to record a Coriolis force that occurs owing to a rotational movement of the substrate around the z axis.

To record a second component of the yaw rate vector, it is advantageous to operate one of the drive elements in x direction and arrange it with an anchor on the substrate in such a way that it can be swiveled around the y axis. As a result of this, a Coriolis force generated by the substrate's rotation around the y axis is recorded.

To record a third component of the yaw rate vector, it is advantageous if one of the drive elements is operated in y direction and arranged with an anchor on the substrate in such a way that it can be fully or partially swiveled around the x axis. This arrangement allows the Coriolis force that occurs as a result of the substrate's rotation around the x axis to be recorded. Two or three of the drive elements mentioned above can determine two or three components of the sensor's yaw rate vector. Thus, as a result of the arrangement of simple and known drive elements, the sensor is able to determine three sensor rotations. The synchronization of the drive movements of the drive elements also allows one to use a joint and economical drive control and obtain an accurate measurement for all three components of the yaw rate vector.

In an advantageous execution of the invention, the drive elements are driven by drive electrodes assigned to them. A part of the drive electrodes are attached to the substrate and another part to the drive elements. An alternating voltage is applied in phase opposition on the drive electrodes executed in pairs, whereby the drive elements are reciprocally attracted towards the two drive electrodes of the pair. In this way, an oscillatory movement of the drive elements is maintained.

In an advantageous execution of the invention, the drive elements have a largely rectangular layout. Because of this, they can be compactly arranged on the substrate and generally need only a small, especially rectangular floor plan. Thus, an especially small sensor for recording two or three components of the yaw rate vector should be obtained.

To obtain a particularly uniform MEMS sensor without disturbing torques, it is advantageous for the drive elements to have partial elements driven in opposite phase. The masses moved as a result of this are alike, so that if there are no Coriolis forces, a total torque of 0 magnitude is obtained in each case. Thus, the sensor in this case is capable of providing exceptionally accurate measuring results.

So rotations of the substrate around an axis can be determined, it is advantageous if at least the partial elements are arranged in the corresponding drive elements on a beam positioned in tiltable manner on the substrate. In this case, it is particularly advantageous for the coupling devices to be executed in such a way that they can transfer thrust and pulling forces in driving direction on the one hand, but also secure the opposing swiveling of the drive elements out of the x-y plane by making the coupling device in z direction very stiff.

Figure 2:
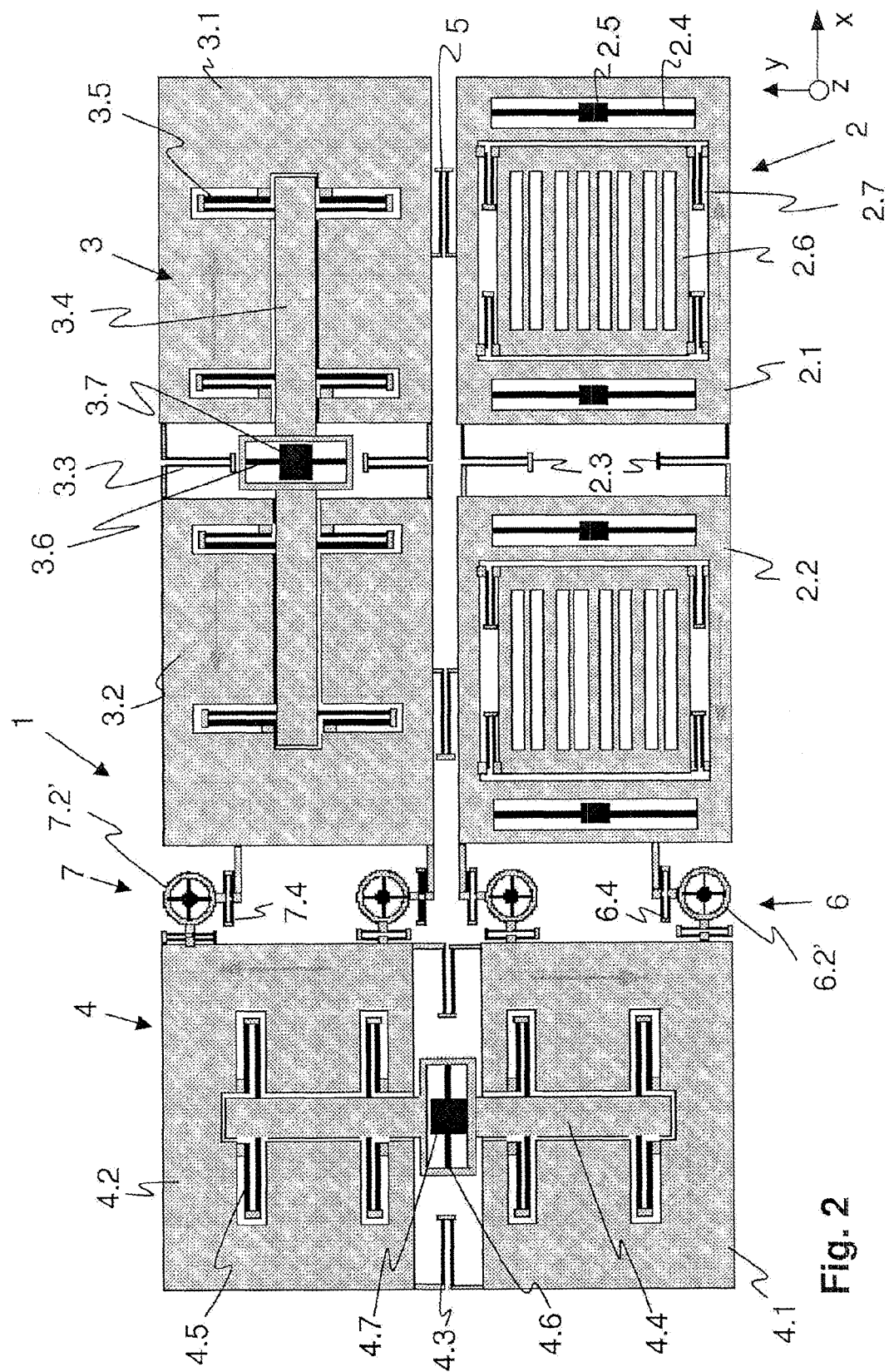

Other advantages of the invention are described with the help of the embodiments shown in the following figures, which show:

FIG. 1 A 3-D gyroscope with a rectangular layout and an arched coupling device, and FIG. 2 A 3-D gyroscope with a rectangular layout and an circular coupling device FIG. 1 shows a schematic representation of a 3-D MEMS gyroscope 1 with a rectangular layout. The micro-electromechanical sensor 1 consists of three drive elements 2, 3 and 4. Every one of the drive elements 2, 3 and 4 is provided for determining in each case one component of a yaw rate vector. The drive element 2 consists of two partial elements 2.1 and 2.2. These partial elements 2.1 and 2.2. oscillate in opposite directions with drive electrodes (not shown). They are connected to each other with a pair of springs 2.3. The springs 2.3 are elastically executed in x direction, so that the partial elements 2.1 and 2.2 approach one another but can be separated from each other and their opposite movement synchronized.

Each partial element 2.1 and 2.2 is arranged on anchors 2.5 with springs 2.4. Inside every one of the partial elements 2.1 and 2.2, sensor elements 2.6 that can be deflected in y direction have been arranged. To achieve this, the partial elements 2.1 and 2.2. and the sensor elements 2.6 have been connected with pairs of springs 2.7. In case the substrate on which the drive element 2 is arranged with the anchor 2.5 is rotated in z direction, a Coriolis force occurs that deflects the sensor elements 2.6 in y direction. This deflection can be determined, for example, with electrodes or capacitors (not shown) positioned inside the indicated recesses.

The partial elements 3.1 and 3.2 of the drive element 3 are likewise driven in x direction and oscillate in opposite direction. These partial elements 3.1 and 3.2 are connected to each other with springs 3.3, so that the partial elements 3.1 and 3.2 can approach and then be separated from one another and synchronized in the process. Furthermore, the drive elements 3.1 and 3.2 are arranged on a beam 3.4 that can be swiveled around the y axis with the help of springs 3.5. The springs 3.5 allow the partial elements 3.1 and 3.2 to move in x direction relative to the beam 3.4, which is attached to an anchor 3.7 on the substrate with the help of a spring 3.6. The spring 3.6 allows the beam 3.4 to tilt in an oscillating way around the y axis as soon as the substrate starts rotating around the y axis.

The third drive element 4 is arranged perpendicularly to the two other drive elements 2 and 3 and executed like the drive element 3 in this embodiment. However, it can be designed otherwise. The drive element 4 consists of partial elements 4.1 and 4.2 connected with each other through springs 4.3. The partial elements 4.1 and 4.2 oscillate in opposite directions to one other; each one is arranged on a beam 4.4 with springs 4.5 so they can be driven in y direction. The beam 4.4 is arranged on an anchor 4.7 through a torsion spring 4.6 so it can be swiveled. As soon as the substrate rotates around the x axis, the occurring Coriolis force makes the beam 3.4 swivel around the x axis together with the partial elements 4.1 and 4.2.

To synchronize the drive movements of the drive elements 2 and 3, they are connected to one another with synchronization springs 5. Since the synchronization springs are stiff in x direction, the drive movements of the partial elements 2.1 and 3.1 as well as 2.2 and 3.2 run synchronously to each other. On the other hand, the synchronization springs are non-rigid in z direction, so that the partial elements 3.1 and 3.2 can swivel without impediment.

To synchronize the movement of the drive element 2 with the drive element 4, the partial element 2.2 is connected to the partial element 4.2 by means of a coupling device 6. This coupling device 6 consists of two arched struts 6.2, each strut 6.2 rotatable around an anchor 6.1. The strut 6.2 is attached to an anchor 6.1 on the substrate with the help of a spring 6.3. On the one hand, the ends of the strut 6.2 are attached to the partial element 2.2 and, on the other hand, to the partial element 4.2. The movements of the partial element 2.2 and of the partial element 4.2 set the strut 6.2 in an oscillatory swinging motion. Because the strut 6.2 has been rigidly executed, it is capable of deflecting the direction of movement and allowing the movements of the partial elements 2.2 and 4.2 to be executed synchronously. To obtain a uniform and synchronous operation of the partial elements 2.2 and 4.2, two of the coupling devices 6 are arranged between the two partial elements 2.2 and 4.2.

The coupling device 6 is executed similarly to the coupling device 7; merely the direction of the arch of the strut 7.2 is oriented differently, as the partial element 4.1 moves in opposite direction to the partial element 4.2. A synchronized movement of the partial element 3.2 with the partial element 4.1 is also generated through the coupling device 7 with the anchor 7.1, the strut 7.2 and the spring 7.3. With regard to thrust and pull, the struts 6.2 and 7.2 are stiff, but with regard to the oscillating out of the x-y plane, they are executed non-rigidly, however. This is necessary for allowing an oscillation of the partial element 2.2 or 3.2 out of the x-y plane during an oscillation around the y axis or when the partial elements 4.1 and 4.2 also oscillate out of the x-y axis when there is a rotation around the x axis.

FIG. 2 shows equal drive elements 2, 3 and 4. The coupling of the drive elements 2 and 3 also takes place with synchronization springs 5; merely the coupling devices 6 and 7 are executed differently. In this embodiment, they consist of the circularly executed struts 6.2' and 7.2'. Arranged on the struts are spring devices 6.4 and 7.4, which although rigid, serve the purpose of transferring the drive movements, but they are non-rigid in a direction perpendicular to the thrust entering. This arrangement allows tensions to be prevented, especially when the partial elements 2.2 and 3.2 swivel with respect to 4.2 and 4.1. Furthermore, the circular struts 6.2' are more stably attached to the anchor 6.1. Since the springs 6.3 are arranged in the form of spokes, a uniform rotation of the struts 6.2' can occur. The same applies to the coupling device 7.

The invention is not restricted to the embodiments shown. In particular, modifications and combinations from the individual embodiments are possible within the specification.

The invention claimed is:

1. A micro-electro-mechanical (MEMS) sensor comprising drive elements configured to move linearly along an x-y plane, the drive elements are arranged on a substrate to determine at least two components of a yaw rate vector, wherein a first group of drive elements that is configured to move perpendicularly to each other is connected by a first coupling device that is rotatably arranged on the substrate to synchronize the perpendicular movement, and wherein a second group of drive elements that is configured to move parallel to each other is connected by a second coupling device that synchronizes the parallel movement.

2. The MEMS sensor according to claim 1, wherein the second group of drive elements is stiff in a drive direction.

3. The MEMS sensor according to claim 1, wherein the first coupling device is a strut.

4. The MEMS sensor according claim 3, wherein the strut is configured to rotate around an anchor point.

5. The MEMS sensor according to claim 3, wherein the strut is arch-shaped.

6. The MEMS sensor according to claim 3, wherein the strut is circular.

7. The MEMS sensor according to claim 3, wherein the strut comprises:
 a first end that is connected to a first drive element driven in x-direction; and
 a second end that is connected to a second drive element driven in y-direction.

8. The MEMS sensor according to one of the claim 7, further comprising a spring device located between the strut and at least first or second drive element.

9. The MEMS sensor according to claim 8, wherein the spring device is stiff in a drive direction and elastic when perpendicular to the drive direction.

10. The MEMS sensor according to claim 1, wherein the drive elements comprise pairs of subsections that are configured to be driven in a drive direction.

11. The MEMS sensor according to claim 1, wherein a drive element is driven in an x-direction and anchored on the substrate in such a way that the drive element can be fully or partially deflected in a y-direction to detect a Coriolis force caused by a rotational movement of the substrate around a z-axis.

12. The MEMS sensor according to claim 1, wherein a drive element is driven in the y-direction and is arranged with an anchor on the substrate in such a way that the drive element can be fully or partially swiveled around the x-axis for recording a Coriolis force that occurs as a result of a rotational movement of the substrate around the x-axis.

13. The MEMS sensor according to claim 1, wherein a drive element is driven in the x-direction and anchored on the substrate in such a way that the drive element can be fully or partially swiveled around the y-axis to detect a Coriolis force caused by a rotational movement of the substrate around the y-axis.

14. The MEMS sensor according to claim 1, further comprising drive electrodes that are assigned to the drive elements.

15. The MEMS sensor according to claim 1, wherein the drive elements have substantially rectangular layout.

16. The MEMS sensor according to claim 1, wherein the drive elements comprise partial elements that are driven out-of-phase.

17. The MEMS sensor according to claim 16, further comprising a beam that is affixed on the substrate, at least two partial elements are tiltably arranged on the beam.

* * * * *